United States Patent Office 2,758,923
Patented Aug. 14, 1956

2,758,923

STABILIZED VITAMIN PREPARATIONS AND METHOD OF PREPARING THE SAME

Richard D. Wakely, Chicago, Ill., assignor to Peter Hand Brewery Company, Chicago, Ill., a corporation of Illinois No Drawing. Application March 31, 1953,
Serial No. 346,013

14 Claims. (Cl. 99—11)

This invention relates to methods for improving the stability of vitamin $D_2$ and vitamin $D_3$ and to the novel products thereof.

The extensive need for, and use of, vitamins $D_2$ and $D_3$ in the production of fortified food products, coupled with the known instability of these vitamins in the presence of air, light and minerals has imposed great difficulties on all participants in the production, sale and use of these products.

Attempts have been made to at least minimize the degree of deterioration of vitamins $D_2$ and $D_3$ to which these vitamins are so highly susceptible, but without any real success. Thus, in seeking to improve their stability characteristics, these vitamins have been mixed with antioxidants and lecithin; they have also been incorporated in carriers such as wheat middlings, soy bean grits, dry milk solids and the like. Though a certain degree of stability may be imparted to the vitamins thereby, it is far from adequate, particularly where the vitamin $D_2$ or $D_3$ preparation is to be stored, and especially if during such storage such preparations will be in contact with air, light and mineral matter. Since the fortification of such products as animal feeds, for example, nearly always includes the addition to such feed of various so-called "mineral supplements" in the form of salts and the like, the importance of the instability of these vitamins in the presence of minerals is realized.

Accordingly, one of the important objects of my invention is to provide vitamin preparations containing vitamin $D_2$ or vitamin $D_3$ which are in a substantially stable form.

Another object is to provide compositions whose vitamin $D_2$ or $D_3$ activity remains substantially constant over relatively long periods of time and under adverse conditions.

Another object is to provide a stable preparation of vitamin $D_2$ or $D_3$ whose potency remains at a substantially constant level when the preparation is subjected to the normally destructive influences of other materials, adverse processing conditions, or extended period of storage.

Another object is to provide vitamin $D_2$ and vitamin $D_3$ having improved stability and water solubility characteristics.

Another object is to provide a feed supplement comprising vitamin $D_2$ and/or $D_3$ and dietary minerals characterized by the improved stability of the vitamin $D_2$ and/or $D_3$.

This invention proceeds on my discovery that by reacting vitamin $D_2$ or $D_3$ with certain bile acids, namely those having a hydroxy group specifically in the 3 and 12 positions, such as desoxycholic or apocholic acids, that a composition is produced which has vitamin activity substantially equivalent to the activity of the vitamin reacted, and which has, additionally, an outstanding degree of stability in the presence of minerals, oxidizing agents, light, air and heat.

The novel compositions of this invention may be prepared by mixing vitamin $D_2$ or $D_3$ with the bile acid in a suitable solvent, and forcing a precipitation by adding water, acidulated water or salt water thereto, or by evaporating the solvent mixture.

The following examples will illustrate my invention in further detail, it being understood, of course, that these examples are illustrative only and are not to be construed in a limiting sense.

EXAMPLE I

*Vitamin $D_2$—desoxycholic acid preparation*

A number of preparations were made by dissolving various amounts of pure crystalline vitamin $D_2$ and desoxycholic acid in methanol. The methanol was then evaporated under vacuum at a temperature sufficient to remove the adhering solvent. There resulted in all cases white, crystalline products having thaw points as shown in the table below.

TABLE I

| Wt. DCA[1] (g.) | Wt. Vit. $D_2$ (g.) | Percent DCA | Approx. Mole. Ratio DCA-$D_2$ | Thaw. Point of Prep., °C. |
|---|---|---|---|---|
| 0.2198 | .2113 | 51.0 | 1:1 | 76 |
| 0.5206 | .1668 | 75.7 | 3:1 | 93 |
| 1.2358 | .2968 | 80.6 | 4:1 | 96 |
| 1.0715 | .2359 | 82.0 | 4.5:1 | 97 |
| 1.0393 | .1998 | 83.9 | 5:1 | 98 |
| 1.1596 | .2086 | 84.8 | 5.5:1 | 99 |
| 1.4176 | .2271 | 86.2 | 6:1 | 100 |
| 0.9430 | .1434 | 86.8 | 6.5:1 | 101 |
| 1.0828 | .1301 | 89.3 | 8:1 | |

[1] Desoxycholic acid.

EXAMPLE II

*Vitamin $D_3$—desoxycholic acid preparation*

Various amounts of pure crystalline vitamin $D_3$ and desoxycholic acid (calculated 98% purity) were dissolved in methanol. The methanol was then evaporated under vacuum at a temperature sufficient to remove the adhering solvent. There remained in all cases white, crystalline products with thaw points as shown in the table below.

TABLE II

| Wt. DCA[1] (g.) | Wt. Vit. $D_3$ (g.) | Percent DCA | Mole. Ratio | Thaw. Point of Prep., °C. |
|---|---|---|---|---|
| 0.1621 | 0.1578 | 50.7 | 1:1 | 74 |
| 0.3266 | 0.1047 | 75.7 | 3:1 | 94 |
| 1.0890 | 0.2637 | 80.5 | 4:1 | 98 |
| 1.0814 | 0.2117 | 83.6 | 5:1 | 106 |
| 1.5346 | 0.2494 | 86.0 | 6:1 | 102 |
| 1.4001 | 0.1700 | 89.2 | 8:1 | 104 |

[1] Desoxycholic acid.

EXAMPLE III

Since mineral matter and moisture are known to be particularly destructive to vitamin $D_3$, a number of vitamin $D_3$-desoxycholic acid compositions were prepared as in Example II and the stability thereof tested by mixing them in a commercial swine mineral blend; the mineral blend had the following composition: phosphorous—16%; iodine—0.035%; manganese—1.10%; iron—0.90%; copper—0.07%; cobalt—0.022%; calcium—26%.

These mixtures were assayed chemically and then stored at 45° C. and 100% relative humidity. At the end of six days they were reassayed with the results shown in Table III below.

TABLE III

| Molecular Ratio, DCA:D₃ | Percent Retention |
|---|---|
| Pure D₃ | 16.9 |
| 1:1 | 57.0 |
| 3:1 | 64.4 |
| 4:1 | 74.5 |
| 5:1 | 88.0 |
| 6:1 | 91.0 |
| 8:1 | 86.4 |

EXAMPLE IV

A similar test was conducted with compositions of vitamin D₂- desoxycholic acid, prepared in accordance with Example I, and mixed with a commercial swine mineral blend like the one used in the previous example. The mixtures were assayed and stored as in the foregoing example. At the end of six days they were chemically reassayed with the results shown in the following table.

TABLE IV

| Molecular Ratio, DCA:D₂ | Percent Retention |
|---|---|
| Pure D₂ | 59.2 |
| 1:1 | 62.2 |
| 3:1 | 95.5 |
| 4:1 | 100.2 |
| 5:1 | 99.2 |
| 6:1 | 99.4 |

EXAMPLE V

A vitamin D₃- desoxycholic acid product, prepared as in Example II and having a vitamin D₃- desoxycholic acid ratio of 1:5 was tested for stability in a side-by-side test with various commercial preparations containing a vitamin D₃ source.

In this test, the vitamin D₃ products under test were mixed in a commercial vitamin "premix" used by feed manufacturers to supplement animal feeds. The premix contained vitamin B₁₂ supplement, antibiotic feed supplement, riboflavin supplement, niacin, calcium pantothenate and choline chloride. Sufficient vitamin D₃ material was added so that the premix samples contained 1000 International Chick Units per gram.

The sample premixes containing various sources of Vitamin D₃ were stored for 8 weeks in cloth bags at 45° C. At the end of this period, each sample was subjected to a biological chick analysis for vitamin D₃, with results as shown below:

TABLE V

| Source of Vitamin D₃ | Percent Retention after 8 Weeks' Storage at 45° C. |
|---|---|
| Commercial D₃ Feeding Oil with added antioxidants and lecithin all carried on wheat standard middlings | 34 |
| Commercial D₃ Feeding Oil carried on soybean grits | 15 |
| Commercial D₃ Feeding Oil carried on soya grits and coated with zein | 20 |
| Commercial Dry D₃ Product advertised as "mineral stable" carried in dry milk solids | 15 |
| Commercial Dry D₃ Product contained in microcrystalline wax | 20 |
| Vitamin D₃-DCA preparation | 90 |

EXAMPLE VI

*Preparation of vitamin D₂—apocholic acid complex*

0.1137 gram of vitamin D₂ and 0.8194 gram of apocholic acid were dissolved in 30 ml. of methanol (anhydrous) and the methanol then removed under vacuum and mild heat. There was left a white crystalline product with a molecular ratio of about 8 moles of apocholic acid to 1 mole of vitamin D₂.

EXAMPLE VII

*Preparation of vitamin D₃—apocholic acid complex*

0.0554 gram of vitamin D₃ and 0.4498 gram of apocholic acid were dissolved in 30 ml. of methanol (anhydrous) and the methanol evacuated under vacuum and mild heat. There remained a white crystalline product with a molecular ratio of about 8 moles of apocholic acid to 1 mole of vitamin D₂.

EXAMPLE VIII

The stability of vitamin D₂ and vitamin D₃—apocholic acid complexes was demonstrated by a comparative test as follows:

The preparation produced in the foregoing Examples VI and VII, as well as samples of pure crystalline vitamin D₂ and vitamin D₃, were mixed with swine mineral blend, as described in Example III, and then stored at 45° C. and 100% relative humidity.

After 8½ days, the mixtures were chemically reassayed, with results as shown in Table VI.

TABLE VI

| Product | Percent Retention |
|---|---|
| crystalline vitamin D₂ | 4.4 |
| crystalline vitamin D₃ | 3.5 |
| vitamin D₂—apocholic acid complex | 78.5 |
| vitamin D₃—apocholic acid complex | 81.8 |

The novel compositions of my invention can also be prepared as shown in the following example, by reacting crude vitamin D₂ or D₃ "resin," instead of the purer, crystalline vitamins, with bile acids. Such "resins" are the well known compositions resulting from irradiation of ergosterol and 7-dehydrocholesteryl acetate and contain, in addition to vitamin D₂ or vitamin D₃ other irradiation products.

EXAMPLE IX 152 grams of crude vitamin D₃ resin containing about twenty million I. C. units of vitamin D₃ per gram was dissolved in 6 liters of warm, anhydrous methanol, and 805 grams of desoxycholic acid was added thereto. This is a ratio of about 5 parts of desoxycholic acid per 1 part of resin. The solvent was removed under vacuum leaving a light brown crystalline material.

This material was compared with the composition described in Example II in which the ratio of desoxycholic acid and vitamin D₃ was 5 to 1.

The comparison was made by mixing each of the aforesaid compositions are described in Example III with a swine mineral blend, assaying the mixtures, storing them at 45° C. and 100% relative humidity, and then re-assaying. Results were as shown in the table below:

*Table VII*

| Product | Days of storage | Percent retention |
|---|---|---|
| Desoxycholic acid-vitamin D₃ preparation having a 5 to 1 ratio of desoxycholic acid to vitamin D₃ | 25 | 68.5 |
| Desoxycholic acid-vitamin D₃ resin composition (prepared as in Example IX) | 23 | 79.5 |

The compositions of the present invention are not mere mixtures of the bile acid and vitamin D₂ or D₃ but are definitely reaction products in the nature of compounds or complexes of some kind. In this connection, the thaw points of the preparations shown in Tables I and II infra, are markedly different from the thaw points of mere mechanical mixtures of desoxycholic acid and vitamin D₂ and D₃.

The present compositions may be rendered water soluble by contacting them with a dilute alkaline solution, e. g. 0.5 N sodium hydroxide solution, and the products of my invention include sodium and potassium salts of the vitamin $D_2$ or $D_3$—bile acid complexes above described, as well as other alkaline earth and alkali metal salts thereof.

While in the above specific examples methanol was used in preparing the bile acid—vitamin $D_2$ or $D_3$ preparations, it is of course understood that other solvents can be used, providing such solvents or solvent mixtures have a mutual affinity for desoxycholic acid or apocholic acid and vitamin $D_2$ or $D_3$. Thus ethanol and acetone are examples of such solvents, and chloroform and methanol examples of suitable solvent mixtures.

It is clear that changes, within the spirit and scope of my invention, will suggest themselves to those skilled in the art and accordingly it is intended that the aforesaid descriptions be construed in an illustrative and not limiting sense.

I claim:

1. A composition comprising a reaction product of a bile acid having hydroxy groups in the 3 and 12 positions and a member selected from the group consisting of vitamin $D_2$ and vitamin $D_3$.

2. The composition of claim 1 wherein the said bile acid is a member selected from the group consisting of desoxycholic acid and apocholic acid.

3. A food supplement comprising dietary minerals and a material comprising the reaction product of a bile acid having hydroxy groups in the 3 and 12 positions with a member of the group consisting of vitamin $D_2$ and vitamin $D_3$.

4. A method of producing a composition having vitamin D potency in a highly stable form characterized by improved resistance to deterioration of such potency which comprises dissolving (a) a member of the group consisting of vitamin $D_2$ and vitamin $D_3$ and (b) a bile acid having hydroxy groups in the 3 and 12 positions, in a common solvent therefor and then removing the solvent therefrom.

5. A composition comprising a reaction product of vitamin $D_2$ and desoxycholic acid.

6. A composition comprising a reaction product of vitamin $D_2$ and apocholic acid.

7. A composition comprising a reaction product of vitamin $D_3$ and desoxycholic acid.

8. A composition comprising a reaction product of vitamin $D_3$ and apocholic acid.

9. The method of producing a composition having vitamin D potency, said composition being characterized by improved resistance to deterioration, which comprises dissolving in methanol (a) a member of the group consisting of vitamin $D_2$ and vitamin $D_3$, and (b) a member of the group consisting of desoxycholic acid and apocholic acid, and separating the methanol from the resulting product.

10. A composition comprising a reaction product of vitamin $D_2$ and desoxycholic acid said reaction product having a molecular ratio of approximately 1 mole of vitamin $D_2$ to from 1 to 8 moles of desoxycholic acid.

11. A composition comprising a reaction product of vitamin $D_2$ and apocholic acid said reaction product having a molecular ratio of 1 mole of vitamin $D_2$ to about from 1 to 8 moles of apocholic acid.

12. A composition comprising a reaction product of vitamin $D_3$ and desoxycholic acid said reaction product having a molecular ratio of 1 mole of vitamin $D_3$ to about from 1 to 8 moles of desoxycholic acid.

13. A composition comprising a reaction product of vitamin $D_3$ and apocholic acid said reaction product having a molecular ratio of about 1 mole of vitamin $D_3$ to about from 1 to 8 moles of apocholic acid.

14. A food supplement comprising dietary minerals and a material comprising the reaction product of a bile acid having hydroxy groups in the 3 and 12 positions with a member of the group consisting of vitamin $D_2$ and vitamin $D_3$, said reaction product having a molecular ratio of about 1 mole of the vitamin to about from 1 to 8 moles of the bile acid.

References Cited in the file of this patent

UNITED STATES PATENTS

| | | |
|---|---|---|
| 2,205,925 | Hickman | June 25, 1940 |
| 2,311,517 | Buxton et al. | Feb. 16, 1943 |

OTHER REFERENCES

"Anales De La Asociacion De Quimica Y Farmacia Del Uroguay, Tomo 50, 1948 (publicado en Julio), page 16.

Chem. Abs., 23 (1929), 3490[5].

Chem. Abs., 31 (1937), 8614[3].